(12) United States Patent
Bar-Ness et al.

(10) Patent No.: US 8,014,809 B2
(45) Date of Patent: Sep. 6, 2011

(54) METHOD AND SYSTEM FOR DECENTRALIZED POWER CONTROL OF A MULTI-ANTENNA ACCESS POINT USING GAME THEORY

(75) Inventors: Yeheskel Bar-Ness, Marlboro, NJ (US);
Osvaldo Simeone, Hoboken, NJ (US);
Igor Stanojev, Harrison, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 789 days.

(21) Appl. No.: 12/001,470

(22) Filed: Dec. 11, 2007

(65) Prior Publication Data
US 2008/0167064 A1 Jul. 10, 2008

Related U.S. Application Data

(60) Provisional application No. 60/874,143, filed on Dec. 11, 2006.

(51) Int. Cl.
*H04B 7/00* (2006.01)
(52) U.S. Cl. ...... 455/522; 455/69; 455/13.4; 455/115.1; 455/101; 370/252
(58) Field of Classification Search .......... 455/522, 455/69, 13.4, 115.1, 446, 562.1, 101; 370/252, 370/338; 375/260; 700/53; 705/7; 726/2, 726/6
See application file for complete search history.

(56) References Cited

U.S. PATENT DOCUMENTS
2010/0266054 A1* 10/2010 Mielczarek et al. .......... 375/260

FOREIGN PATENT DOCUMENTS
WO WO 2006/039803 A 4/2006

OTHER PUBLICATIONS

J. Huang et al., "Distributed Interference Compensation for Wireless Networks", IEEE Journal on Selected Areas in Communications, vol. 24, No. 5, pp. 1074-1084, May 2006.*
International Preliminary Report on Patentability for PCT/IB2007/004053, issued Jun. 16, 2009.
R. D. Yates, "A Framework for Uplink Power Control in Cellular Radio Systems", *IEEE Journal on Selected Areas in Communications*, vol. 13, No. 7, pp. 1341-1347, Sep. 1995.
C. Saraydar et al., "Efficient Power Control via Pricing in Wireless Data Networks", *IEEE Transactions on Communications*, vol. 50, No. 2, pp. 291-303, Feb. 2002.
A. Agustin et al., "A Game Theoretic Approach for Cooperative MIMO Schemes with Cellular Reuse of the Relay Slot", *2004 IEEE ICASSP*, pp. IV 581-IV 584, 2004.
Cui et al., "Energy-Efficiency of MIMO and Cooperative MIMO Techniques in Sensor Networks", *IEEE Journal on Selected Areas in Communications*, vol. 22, No. 6, pp. 1089-1098, Aug. 2004.

(Continued)

*Primary Examiner* — Temesghen Ghebretinsae
*Assistant Examiner* — Shaima Q Aminzay

(57) ABSTRACT

Power control for uplink channels with non-cooperative and rational mobile stations (MS) provided using game theory. As a game leader, a multi-antenna access point (AP) determines the network parameters (bandwidth and the number of receiving antennas) for the power control game played between the mobile stations (MSs) (follower), so as to maximize the network utility per system resource (bandwidth and antennas).

14 Claims, 6 Drawing Sheets

OTHER PUBLICATIONS

M. Hayajineh and C.T. Abdallah, "Distributed Joint Rate and Power Control Game-Theoretic Algorithms for Wireless Data", *IEEE Communications Letters*, vol. 8, No. 8, pp. 511-513, Aug. 2004.

O. Ileri et al., "Pricing for Enabling Forwarding in Self-Configuring Ad Hoc Networks", *IEEE Journal on Selected Areas in Communications*, vol. 23, No. 1, pp. 151-162, Jan. 2005.

S. Haykin, "Cognitive Radio: Brain-Empowered Wireless Communications", *IEEE Journal on Selected Areas in Communications*, vol. 23, No. 2, pp. 201-220, Feb. 2005.

C.A. St. Jean and B. Jabbari, "Game-Theoretic Power Control in DS-CDMA Wireless Networks with Successive Interference Cancellation", *Electronics Letters*, vol. 42, No. 3, Feb. 2, 2006.

J. Huang et al., "Distributed Interference Compensation for Wireless Networks", *IEEE Journal on Selected Areas in Communications*, vol. 24, No. 5, pp. 1074-1084, May 2006.

G. Scutari et al., "Potential Games: A Framework for Vector Power Control Problems with Coupled Constraints", *2006 IEEE ICASSP*, IV-241-244, 2006.

International Search Report for PCT/IB2007/004053, mailed Aug. 14, 2008.

Written Opinion for PCT/IB2007/004053, mailed Aug. 14, 2008.

I. Stanojev et al., "Optimal Design of a Multi-Antenna Access Point with Decentralized Power Control Using Game Theory", *2nd IEEE International Symposium on New Frontiers in Dynamic Specctrum Access Networks*, Apr. 1, 2007, pp. 476-481.

W. Zhong et al., "Distributed Game-Theoretic Power Control for Wireless Data Over MIMO CDMA System", *Communications, Circuits and Systems 2005. Proceedings*, International Conference on Hong Kong, China May 27-30, 2005, pp. 237-241.

Examination Report for GB Application GB0911875.3, mailed Oct. 20, 2010.

\* cited by examiner

METHOD AND SYSTEM FOR DECENTRALIZED POWER CONTROL OF A MULTI-ANTENNA ACCESS POINT USING GAME THEORY

CROSS-REFERENCE TO RELATED PATENT APPLICATIONS

The present application claims priority to U.S. Provisional Application Ser. No. 60/874,143 entitled "Method and System for Optimal Design of a Multi-Antenna Access Point with Decentralized Power Control Using Game Theory" filed on Dec. 11, 2006, and incorporated herein by reference in its entirety.

STATEMENT OF FEDERALLY FUNDED RESEARCH

The present application relates to research supported in part by the National Science Foundation under Grant CNS-0626611. The United States government may have rights in the work.

FIELD

The present application relates to the filed of power control in communication systems. More specifically, it relates to decentralized power control of a multi-antenna access point using game theory.

BACKGROUND

Power control is typically employed in uplink wireless channels in order to guarantee a sufficient strength of the user's signal while limiting its interfering effect on signals belonging to other users. Optimal power control mechanisms require the access point (AP) to be able to directly control the power transmitted by mobile stations (MSs). This direct control cannot be guaranteed in some wireless networks, such as in systems complying with the cognitive radio principle, where competitive behavior is expected to be predominant.

Heretofore, game theory, a mathematical framework thoroughly investigated and employed in economic field, has not been used as a paradigm for modeling the performance of wireless networks that involve multiple nodes (i.e., MSs) not controlled by some central authority. As these independent nodes (players in the game-theoretic jargon) have goals that are usually in conflict with each other, their selfish behavior might lead to extremely poor network performance. Game theory allows to predict the possible outcomes of interaction (game) between the competitive MSs, in terms of Nash Equilibria (NE). Therefore, it can define a set of rules to be enforced on the players that would lead to more desirable outcome.

Prior power control systems and methods in wireless communication networks have not include decentralized power control and game theory.

SUMMARY

According to one aspect described in the present application, decentralized power control is provided in a wireless network using game theory. Although the mobile stations (MSs) are not directly controlled by the access point (AP), the game they participate in, along with its Nash Equilibria (NE), is strongly dependent on the network parameters set by the AP (for example, available bandwidth and number of AP antennas). Therefore, an exemplary system design requires the AP to set those parameters in a manner that provokes the most desirable power allocation (NE) from the MSs. The framework where one agent (set of MSs) acts subject to the strategy that the other agent (AP) chose (with the latter aware that his action is observed), is referred to as a Stackelberg game. Moreover, the corresponding optimal pair of system parameters and power allocation is referred to as a Stackelberg Equilibrium (SE).

According to another aspect described in the present application, there are two network models. The first model assumes that the MSs' actions are dictated by the transmission power minimization under minimum capacity (transmission rate) constraints, while the second model is concerned with maximizing the power efficiency of the MSs. The service provider (AP) is consumer-oriented, and it aims at maximizing the users' preferences, while saving on investments such as bandwidth and network infrastructure (namely, AP antennas).

According to yet still another aspect, a method for decentralized power control of a multi-antenna access point in a wireless network includes setting network parameters as N, number of access point antennas, and G, processing gain, receiving a Nash Equilibrium for each of a plurality of mobile stations, and calculating network parameters with the received Nash Equilibrium to maximize a long-term revenue function.

According to yet still another aspect, a system for decentralized power control of a multi-antenna access point in a wireless network includes an access point antenna having a processor programmed to calculate network parameters and a plurality of mobile stations. Each of the plurality of mobile stations have a processor programmed to calculate a Nash Equilibrium of a non-cooperative game K, P $\{u_i(\bullet)\}$ played by the plurality of mobile stations. The processor of the access point antenna calculates network parameters to maximize a long-term revenue function based on the Nash Equilibrium from the plurality of mobile stations.

According to further still another aspect, a system having a set of single antenna mobile stations transmitting in the same time frequency towards an access point using asynchronous code-division access with a processing gain includes an access point and a set of mobile stations. The access point maximizes a long-term revenue function which depends on number of antennas and processing gain. The set of mobile stations in communication with the access point receives the number of antennas and processing gain from the access point and each of the set of mobile stations provides a Nash Equilibrium for the long-term revenue function based on the number of antennas and processing gain. The access point calculates a number of antennas and processing gain together with the Nash Equilibrium for each of the set of mobile stations that maximize the long-term revenue function.

These and other features, aspects and advantages of the present invention will become apparent from the following description, appended claims, and the accompanying exemplary embodiments shown in the drawings, which are briefly described below.

DETAILED DESCRIPTION

Exemplary embodiments are described below with reference to the accompanying drawings. It should be understood that the following description is intended to describe exemplary embodiments of the invention, and not to limit the invention.

A set of K single-antenna MSs transmit in the same time-frequency resource towards an AP with transmission powers $P_i$, i=1, ..., K, using asynchronous code-division access with processing gain $G \geq 1$. The set of all transmission powers is $P=(P_1, P_2 ..., P_K)^T \in \wp$, where $\wp$, is the set of allowed MSs' powers, and the maximum transmission power per user is denoted as $P_{max}$. The AP is equipped with N (receiving) antennas, and the independent identically distributed (iid) complex Gaussian channel gains between ith MS and jth AP antenna are denoted as $h_{ij}$. Using a vector notation, the set of channels between user i and N antennas is $h_i=(h_{i1}, ..., h_{iN})^T$, while the set of all channel gains is given by N×K matrix $H=(h_1, h_2, ..., h_K)$. Matched filtering (MF) is used at the AP with no interference cancellation. White Gaussian noise at any of the AP antennas is independent, with single-sided power spectral density $N_o$. Interference coming from other users' signals is modelled as Gaussian noise. Assuming that the station are sending "Gaussian codewords" and, without loss of generality, that the used bandwidth is G Hz, the maximum achievable rate for the ith MS, $C_i$ (in bit/sec), can be written as:

$$C_i(P, H, N, G) = \log_2(1 + SINR_i), \quad (1)$$

where the Signal to Noise plus Interference Ratio for the ith MS, $SINR_i$, at the output of the MF is easily shown to be:

$$SINR_i = \frac{P_i \|h_i\|^2}{N_0 + \frac{1}{G} \sum_{\substack{k=1 \\ k \neq i}}^{K} \frac{|h_i^H h_k|^2}{\|h_i\|^2} P_k}. \quad (2)$$

In (1), the achievable rate $C_i$ is dependent on the set of transmission powers P, channel gain matrix H and the parameters set by the AP, N and G.

Figure 1:
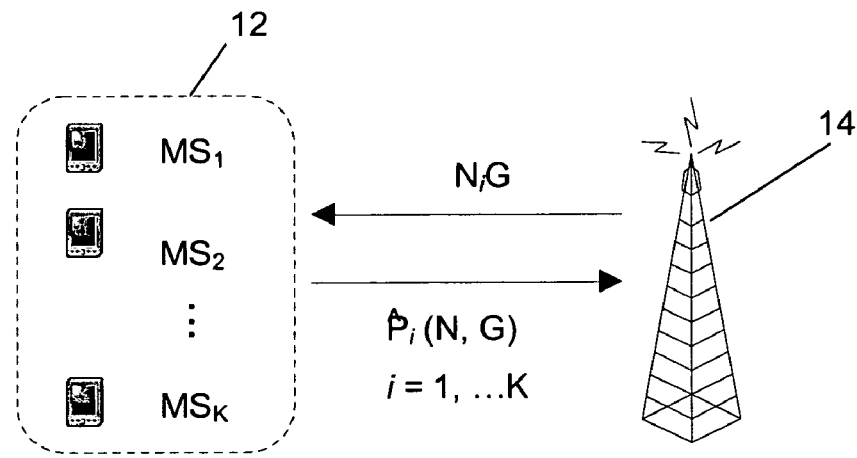
FIG. 1 is a communication system including an access point and mobile stations in accordance with an exemplary embodiment.

In a communication system, shown in FIG. 1, there are two system entities, namely the set of MSs 12 on one side and an access point (AP) 14 on the other. The goal of the AP 14 is the maximization of a long-term revenue function ρ(N,G) that depends on both the network parameters (number of antennas N and processing gain G), that are under the direct control of the AP 14, and the behavior of the MSs 12 that cannot be directly controlled by the AP 14. The revenue function ρ(N, G) is defined as an average over the statistics of channel gains H in order to account for different (fading) scenarios.

The goal of each MS is to maximize its own (instantaneous) utility function $u_i(P; N, G, H)$, i=1, ..., K, defined as to reflect MS's preferences, usually in terms of achievable transmission rate and/or consumed power. The degree of freedom of each MS, say ith, is its transmission power $P_i$, while the parameters N and G, and the channel matrix H, are given. To emphasize this point, the notation $u_i(P_i, P_{-i}; N, G, H)$, is used where $P_{-i}$ stands for the vector containing all but the ith element of P (i.e., it denotes the set of other MSs' strategies). Furthermore, the MSs are independent and behave in a selfish and rational manner, with goals typically in direct conflict. The whole set of MSs can be presented as one entity that receives as input the network parameters set by the AP (N and G), and produces an output defined by a Nash Equilibrium (NE). $\hat{P}(N, G, H) = (\hat{P}_1, \hat{P}_2, ..., \hat{P}_K)^T$, of the non-cooperative game κ, ρ, $\{u_i(\cdot)\}$ played by MSs (see FIG. 1).

The interaction between AP 14 and the set of MSs 12 described above can be studied in the framework of Stackelberg games. The AP 14 represents the authority of the game (Stackelberg leader), playing the first move by setting the network parameters (N and G) towards the aim of increasing its revenue function ρ(N,G). The MSs 12 on the other side (Stackelberg follower) respond with the NE $\hat{P}(N, G, H)$ of their non-cooperative game. In principle, this interchange of parameters and MS game outcomes continues until the Stackelberg Equilibrium (SE) is reached, i.e., until the AP 14 finds the set of parameters (N and G) that, together with the corresponding NEs of the MS game, maximize its long-term (i.e., average over channel fading H) revenue function ρ(N,G).

In the following, two game models are presented. In the first game, the MSs (follower) tackle the problem of minimizing the transmission power under minimum transmission rate constraint, while in the second they aim at the (unconstrained) maximization of power efficiency (bit/sec/W). For each game, the AP optimizes the network utility (in terms of collective MSs' preferences) per invested system resource, i.e., per antenna and bandwidth. Performance of the considered distributed models is assessed by comparison with the corresponding centralized scenarios.

Minimizing the Power Under Capacity Constraints

For given network parameters N and G, the goal of the MSi is to minimize its own transmission power $P_i$ under minimum transmission rate constraint, $C_{i,min}$:

minimize $P_i$, i=1, ..., K subject to $C_i(P, H, N, G) \geq C_{i,min}$, (3)

$P_i \in [0, P_{max}]$,

This problem can be formulated as the non-cooperative power control game (NPG) K,P,$\{u_i(P_i, P_{-i})\}$), where K={1, 2, ..., K} denotes the set of K players (MSs), the players' set of strategies P reads $$P = \{P | P_i \in [0, P_{max}], C_i(P, H, N, G) \geq C_{i,min}, \forall i \in K\}, \quad (4)$$

and the ith player's utility function is defined as $$u_i(P_i, P_{-i}) = -P_i, i \in K. \quad (5)$$

Notably, the strategy sets for different users are coupled according to (4). Furthermore, the parameters set by the AP, i.e., N and G, and the channel gains H, influence the game through its constraints and not through its utility $u_i(P_i, P_{-i})$. In a game theory framework, a strictly concave utility function is preferred, such that Equation (5) is replaced with:

$$u_i(P_i, P_{-i}) = -\log_2 P_i, i \in K, \quad (6)$$

where the base 2 of the log function is chosen purely for the sake of consistency with the definition of capacity (1).

The NPG K,P,{$u_i(\bullet)$}), is shown to be an (exact) potential game. Analysis of the game, namely the assessment, existence and uniqueness of NEs, can be simplified for the class of potential games. For a strategic game, say (K$^i$,P$^i$,{$u_i^i(\bullet)$}), to be a potential game, there needs to exist a function U$^i$:P$^i \to \mathbb{R}$ such that for all i∈K! and (P$_i^i$,P$^i_{-i}$), (P$_i^{ii}$,P$^i_{-i}$)∈P$^i$, it satisfies either $u_i^i(P_i^i,P^i_{-i}) - u_i^i(P_i^{ii},P^i_{-i}) = U^i(P_i^i,P^i_{-i})$, in which case it is called an exact potential game; or $u_i^i(P_i^i,P^i_{-i}) - u_i^i(P_i^{ii},P^i_{-i}) > 0 = U^i(P_i^i,P^i_{-i}) (P_i^{ii},P^i_{-i}) > 0$, in which case it is an ordinal potential game. The function U$^i(\bullet)$ is called a potential function. The NPG (K,P,U), has the following potential function:

$$U(P) = \sum_{i=1}^{K} \log_2 P_i \quad (7)$$

Assuming the optimization problem (3) is feasible, the set of strategies P is compact. Furthermore, U(P) is a continuous and strictly concave function on the interior of P. It follows that a strategy P$_{opt}$ that maximizes the potential U(P), P$_{opt}$=$_{arg\ maxP}$U(P), is also a NE of the NPG (K, P,{$u_i(\bullet)$}). Furthermore, since the set P is also convex (in fact, it is a cone), the optimal P$_{opt}$ and therefore the NE, $\hat{P}$(N, G, H)=P$_{opt}$, is unique.

Both Gauss-Seidel and Jacobi algorithms, implementing best response, better response or the gradient projection rule, are guaranteed to reach the NE of the potential game at hand. Here, the Gauss-Seidel algorithm is detailed with the best response rule. The MSs play sequentially, and at the (t+1)th iteration the ith MS updates its transmission power following:

$$P_i^{t+1} = \min(P_i^*, P_{max}) \quad (8)$$

where P$_i^*$ is the minimum power satisfying the constraint C$_i$=C$_{i,min}$ (see (1) and (2)):

$$P_i^* = \frac{(2^{C_{i,min}} - 1)}{\|h_i\|^2} \times \left( N_0 + + \frac{1}{G} \sum_{k=1}^{i-1} \frac{|h_i^H h_k|^2}{\|h_i\|^2} P_k^{t+1} + \frac{1}{G} \sum_{k=i+1}^{K} \frac{|h_i^H h_k|^2}{\|h_i\|^2} P_k^t \right). \quad (9)$$

The converging point of the algorithm is the NE strategy set $\hat{P}$(N, G, H), where $\hat{P}$(N, G, H)=P$_{opt}$.

The revenue function of the AP accounts for the preferences of the service provider, e.g., profit (if it is charging the users for the service while investing in equipment) or quality of service (measured in SINR ratios, achievable rates, the probability of error, etc.). Here, it is assumed that a service provider, following the users' interest, strives to minimize the total power expenditure. However, it is also interested in reducing the cost of the two primary resources: number of antennas and bandwidth. The following revenue function measures the overall average network utility per system resource:

$$\rho(N, G) = \frac{-\sum_{i=1}^{K} E_H[\log_2(\hat{P}_i(N, G, H))]}{NG}. \quad (10)$$

The expectation E$_H[\bullet]$ is taken with respect to fading, since decentralized power control by the MSs is operated according to the instantaneous channel realization, while the system optimization is based on (long-term) channel statistics. Note that the revenue function in (10) depends on the NE of the MS game $\hat{P}_i$, which in turn is a function of parameters N and G, set by the AP.

In some embodiments, the AP is able to control optimally not only the network parameters N and G, but also the MS transmission power, P(N, G, H), toward the goal of maximizing (10) (where the NE $\hat{P}$(N, G, H) is substituted with the variable P(N, G, H)). From the discussion above, the decentralized solution of the power control (NE) for given N and G is the one that maximizes the potential (7). Comparing (7) with (10), it can be seen that decentralized and centralized solution coincide in this case.

Figure 2:
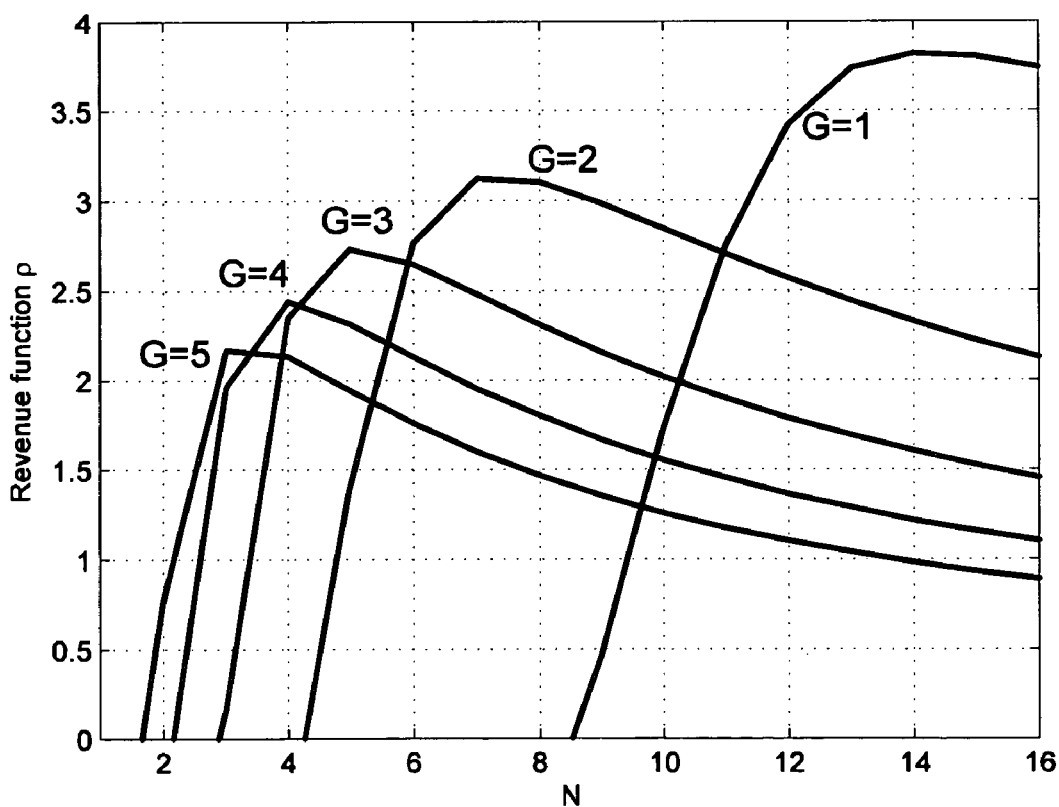
FIG. 2 is a graph showing the revenue function of the access point (AP) of the system of FIG. 1 versus the number of AP antennas, N, for different values of processing gain, G.

The system performance results in this section are obtained for the following parameters: E[$|h_{ij}|^2$]=1, C$_{i,min}$=1 bit/sec, P$_{max}$=2 W and the average Signal to Noise Ratio (defined as SIN R for N=1, K=1 and P=P$_{max}$) is S N R=13 dB. FIG. 2 shows the revenue function ρ(G,N) in (10) versus the number of antennas N for K=10 MSs and different values of processing gain G. It can be observed that, for fixed G, the revenue increases with N up to a certain (optimal) point, after which the collective MS utility (7) (i.e. the numerator in (10)) becomes less then linearly proportional to N. In other words, ρ has a unique maximum, that is a SE, over N for fixed G. Moreover, increasing the processing gain G decreases the optimal value of N. While the reverse also holds, i.e., there is a unique maximum of revenue over G for fixed N, it is interesting to note that investing in antennas N has better effect on revenue function than buying more bandwidth (increasing G). The reason behind this can be explained by pointing out that the number of antennas has a two-fold effect on the SINR (2), i.e., power gain (in the numerator) and interference mitigation (in the denominator): on the other side, G results in interference mitigation only.

Figure 3:
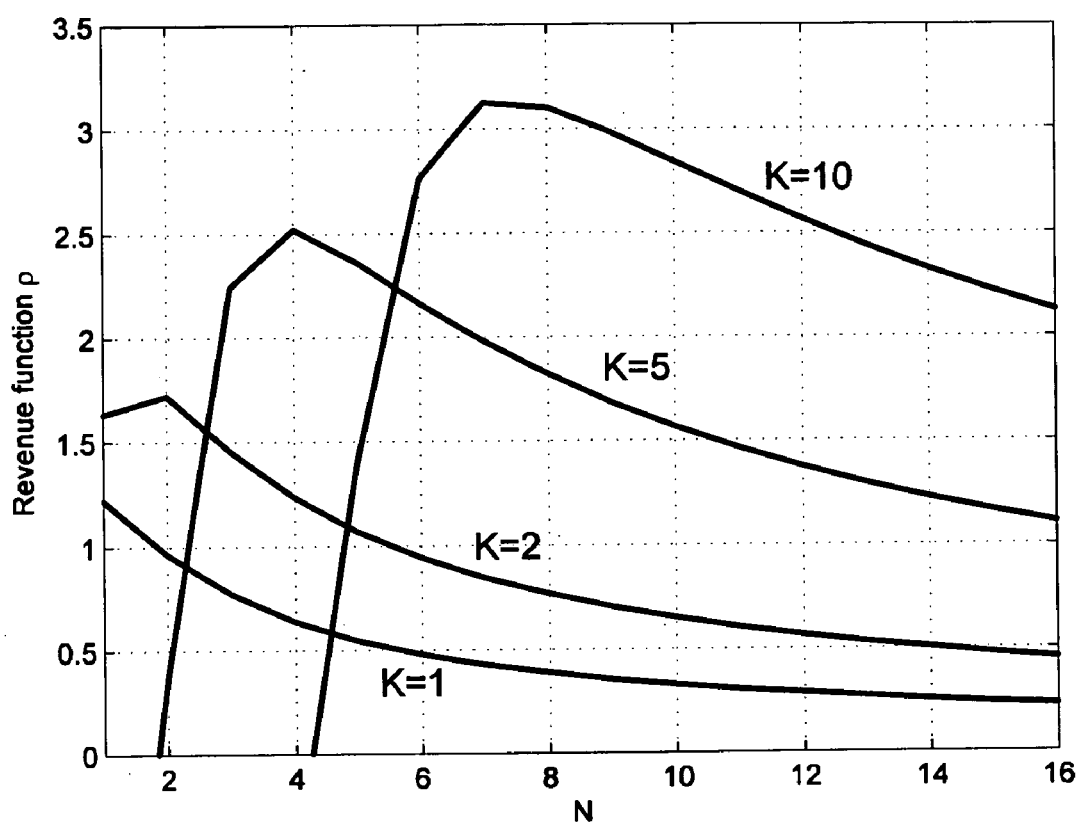
FIG. 3 is graph showing the revenue function of the AP of the system of FIG. 1 versus the number of AP antennas, N, for different number of users, K.

The revenue function versus the number of antennas N for G=2 and different number of users K is presented in FIG. 3. It is interesting to see that a larger number of users, though increasing the required network resources (i.e., antennas and, not shown here, bandwidth) at the optimal points, also increases the network revenue and is therefore desirable from the collective point of view. However, for large values of K, allowing additional users into the system has a negligible effect on the relative increase of the revenue function ρ(G,N).

Figure 4:
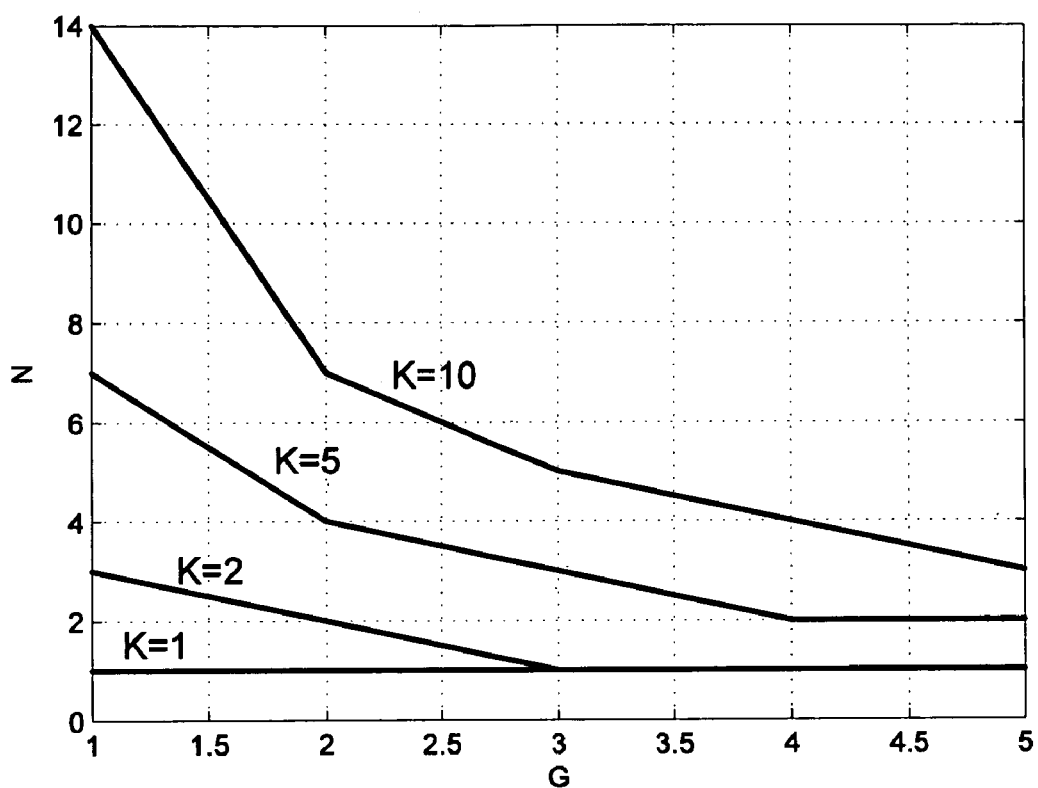
FIG. 4 is a graph showing the Stackelberg Equilibrium in which there is dependence between number of antennas, N, and processing gain, G, with one parameter fixed and another optimally chosen by the AP for different numbers of users K.

The optimal network parameter N (or G) set by the AP in the SE for fixed G (or N), is presented in FIG. 4, for different number of users, K. The well known trade-off between bandwidth and spectral dimension is confirmed. Moreover, it is confirmed that increasing the number of user requires more resources.

Maximizing the Power Efficiency

Instead of minimizing the power under the minimum transmission rate constraint as above, here MSs' preference is considered the maximization of power efficiency:

$$\text{maximize } \frac{C_1(P, H, N, G)}{P_1}, i = 1, \ldots, K, \quad (11)$$

$$\text{subject to } P_i \in [0, P_{\max}].$$

Under the assumption of selfish and rational MSs, problem (11) can be cast as a non-cooperative power control game (NPG) (K,P,{$u_i(\bullet)$}), where K={1, 2, . . . , K} denotes the set of K players (MSs), the players' set of strategies P reads $$P=\{P|P_i\epsilon[0,P_{max}], \forall i \epsilon K\},$$

and the ith player's utility function is defined as $$u_i(P_i, P_{-i}; N, G, H) = \frac{C_1(P, H, N, G)}{P_i}, i \in K. \quad (12)$$

While this utility function strongly reflects the pragmatic preferences of the MSs, it needs a slight modification in order to avoid singularity at $P_i=0$, while preserving quasi-concavity on P:

$$u_i(P_i, P_{-i}; N, G, H) = \frac{C_1(P, H, N, G)}{P_i + P_c}, i \in K. \quad (13)$$

where $P_c$ could be any conveniently chosen constant (for instance, it could account for the power consumed by electronic circuitry of MS). The utility defined in (13) depends on AP parameters N and G, as well as the channel gains H.

In order to reach the NE, the Jacobi algorithm is used, where all the users update their strategy in a parallel fashion using the Newton's method:

$$P^{t+1} = P^t + \alpha \left( d_1^t \frac{\partial u_1}{\partial P_1^t}, \ldots, d_2^t \frac{\partial u_K}{\partial P_K^t} \right)^T, \quad (14)$$

where α is some conveniently chosen small number and $d_i^t$ is chosen as $$d_i^t = \left( \frac{\partial^2 u_1}{(\partial P_i^t)^2} \right)^{-1}. \quad [7]$$

The convergence point of the algorithm is the NE of the game, $\hat{P}(N, G, H)$.

The AP has preferences compatible with the MSs. Therefore, it aims at maximizing the (overall) power efficiency, averaged over fading, while accounting for the resource expenditure:

$$\rho(N, G) = \frac{1}{GN} \sum_{i=1}^{K} E_H \left[ \frac{C_i(\hat{P}_i(N, G, H), N, G, H)}{\hat{P}_i + P_c} \right]. \quad (15)$$

For the centrally optimal solution, the problem maximizes the revenue function (15), by assuming that the AP can also control the set of the MSs' powers P(N, G, H). Therefore, the maximization is carried out with respect to G,N and P(N, G, H). This task can be performed numerically. As shown below, in this case the decentralized solution has degraded performance as compared to the centralized scenario.

Figure 5:
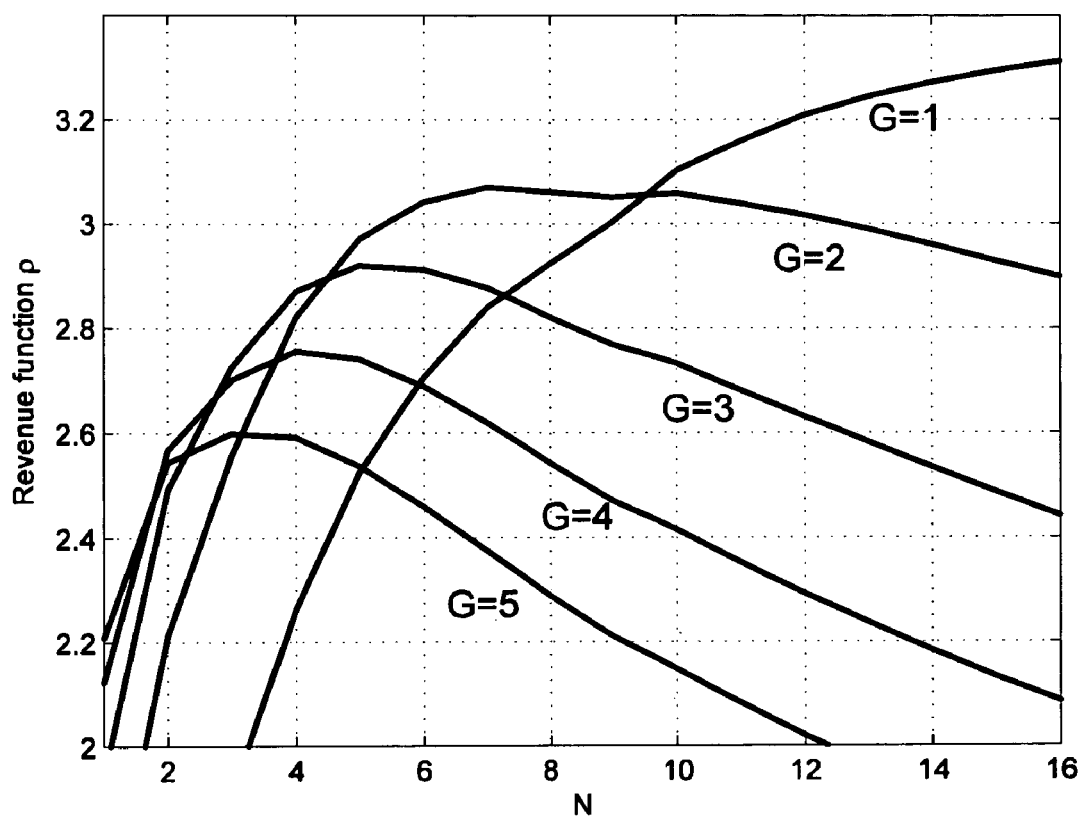
FIG. 5 is a graph showing the revenue function of the access point (AP) of the system of FIG. 1 versus the number of AP antennas, N, for different values of processing gain, G.
Figure 6:
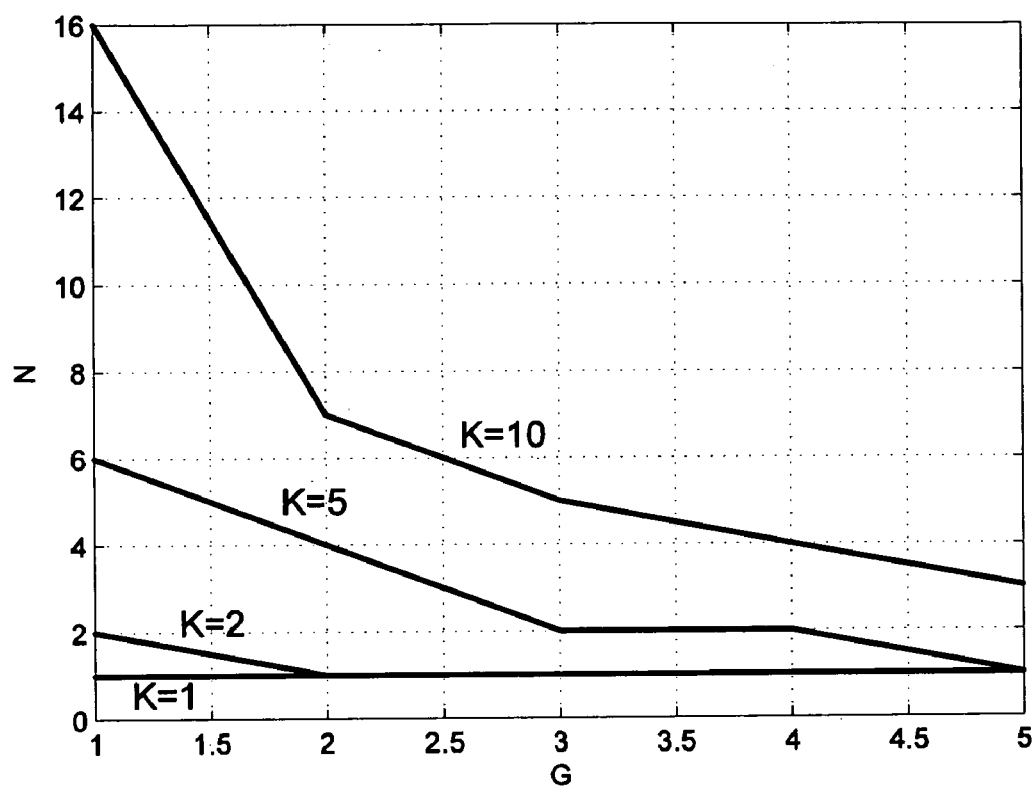
FIG. 6 is a graph showing the Stackelberg Equilibrium in which there is dependence between number of antennas, N, and processing gain, G, with one parameter fixed and another optimally chosen by the AP for different numbers of users K.

FIG. 5 shows the revenue function ρ(G,N) versus the number of antennas N for different values of processing gain G, and parameters $E[|h_{ij}|^2]=1$, $P_c=0.1$ W, $P_{max}=2$ W and S N R=13 dB. The conclusions are very similar to those for the power minimization problem. Furthermore, the dependence among N, G and K for the optimal (SE) solution is shown in FIG. 6, revealing the similar system behavior to that of FIG. 4.

Figure 7:
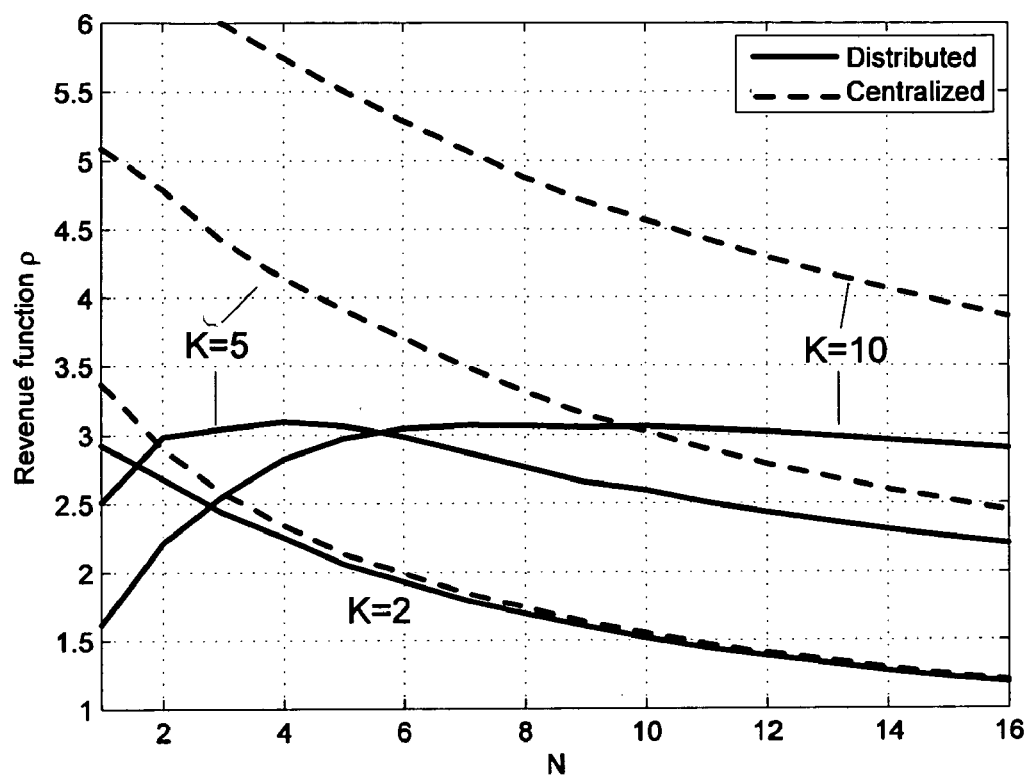
FIG. 7 is a graph showing the revenue function of the access point (AP) of the system of FIG. 1 versus the number of AP antennas, N, for different number of users, K, including a comparison between centralized and distributed scenarios.

FIG. 7 shows the optimal revue function ρ versus number of antennas N, for different number of users K and for both the distributed and centralized scenarios. As expected, centralized control allows to harness a larger revenue. However, as the number of antennas increase, the difference in performance between centralized and decentralized scheme reduces. This shows that with enough interference mitigation options, decentralized power control is not as harmful for the system performance. Moreover, it is clear from FIG. 7 that, by increasing the number of users, the efficiency of the distributed scheme falls behind that of the optimal (centralized) scenario, thus confirming that large distributed systems pose a challenge. Furthermore, it is very interesting to observe that, while the increased number of users is again desirable for the network (at least in centralized scenario), the relevant lack of efficiency for large K can diminish this gain in decentralized scenario.

The Detailed Description provides an analysis of an exemplary design of a multi-antenna access point with decentralized power control in the uplink channel. The optimal solution, in terms of number of antennas and bandwidth, has been studied by modeling the problem as a Stackelberg game between the access point and competitive mobile stations. In this framework, it has been shown that a larger number of users motivates the provider (i.e., access point) to invest, as the overall performance enhancement well balances the costs. It was discussed, however, that in certain decentralized scenarios the system may not efficiently cope with large amount of user. Furthermore, the well-known tradeoff between system resources, bandwidth and antennas, was confirmed.

The foregoing description of exemplary embodiments has been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method for decentralized power control of a multi-antenna access point in a wireless network, the method comprising: setting a first plurality of network parameters comprising N, a number of access point antennas, and G, a processing gain; receiving a Nash Equilibrium for each of a plurality of mobile stations; and calculating a second plurality of network parameters with the received Nash Equilibrium to maximize a long-term revenue function, wherein each mobile station of the plurality of mobile stations is configured to minimize its own transmission power under a minimum transmission rate constraint based on the first plurality of network parameters.

2. The method of claim 1, wherein the long-term revenue function is configured to minimize power under capacity constraints.

3. The method of claim 1, wherein the minimization of transmission power for each mobile station is determined as a non-cooperative power control game, wherein set of strategies, P, for a set, K, of mobile stations is:

$$P = \{P | P_i \in [0, P_{max}], C_i(P,H,N,G) \geq C_{i min}, \forall i \in K\},$$

where $P_i$ is transmission power, $C_i$ min. is minimum transmission rate constraint, and H is a matrix of N×K.

4. The method of claim 3, wherein a utility function for i mobile station is:

$$u_i(P_i, P_{-i}, i \in K.$$

5. The method of claim 3, wherein the plurality of mobile stations play the non-cooperative power control game sequentially and at a (t+1)th iteration, ith mobile station updates transmission power as: $P_i^{t+1} = \min(p_i^*, P_{max})$.

6. The method of claim 1, wherein the long-term revenue function is configured to maximize power efficiency.

7. The method of claim 1, wherein for the first plurality of network parameters, each mobile station of the plurality of mobile stations is configured to maximize power efficiency.

8. The method of claim 7, wherein the maximization of power efficiency for each mobile station is determined as a non-cooperative power control game (NPG) $(K, P, \{u_i(\cdot)\})$, where $K = \{1, 2, \ldots, K\}$ denotes a set of K mobile stations, wherein a set of strategies P for the mobile stations is:

$$P = \{P | P_i \in [0, P_{max}], \forall i \in K\}.$$

9. The method of claim 8, wherein a utility function for i mobile station is:

$$u_i(P_i, P_{-i}; N, G, H) = \frac{C_1(P, H, N, G)}{P_i + P_c}, i \in K,$$

where $P_c$ is a constant, $P_i$ is transmission power, $C_i$ min. is minimum transmission rate constraint, and H represent channel gains.

10. A system for decentralized power control of a multi-antenna access point in a wireless network, the system comprising: an access point antenna having a processor programmed to calculate a first plurality of network parameters; and a plurality of mobile stations, each of the plurality of mobile stations having a processor programmed to calculate a Nash Equilibrium of a non-cooperative game played by the plurality of mobile stations, wherein the processor of the access point antenna calculates a second plurality of network parameters to maximize a long-term revenue function based on the Nash Equilibrium from the plurality of mobile stations, wherein each mobile station of the plurality of mobile stations is configured to minimize its own transmission power under a minimum transmission rate constraint based on the first plurality of network parameters.

11. The system of claim 10, wherein the first plurality of network parameters comprises N, number of access point antennas, and G, processing gain.

12. The system of claim 10, wherein the long-term revenue function is configured to minimize power under capacity constraints.

13. The system of claim 10, wherein the long-term revenue function is configured to maximize power efficiency.

14. The system of claim 10, wherein each mobile station of the plurality of mobile stations is configured to maximize power efficiency based on the first plurality of network parameters.

* * * * *

UNITED STATES PATENT AND TRADEMARK OFFICE
CERTIFICATE OF CORRECTION

PATENT NO. : 8,014,809 B2
APPLICATION NO. : 12/001470
DATED : September 6, 2011
INVENTOR(S) : Bar-Ness et al.

It is certified that error appears in the above-identified patent and that said Letters Patent is hereby corrected as shown below:

Title page, item (56), under "Other Publications", in Column 2, Line 14, delete "IV 581-IV 584," and insert -- IV 581-584, --.

Title page, item (56), under "Other Publications", in Column 2, Line 15, delete "Cui" and insert -- S. Cui --.

Page 2, item (56), under "Other Publications", in Column 2, Line 9, delete "Specctrum" and insert -- Spectrum --.

Column 9, line 5, in Claim 3, delete " $P=\{P|P_i \in [0,P_{max}], C_i(P,H,N,G) \geq C_{i,min}, \forall i \in K\},$ " and insert -- $P = \{P|P_i \in [0,P_{max}], C_i(P,H,N,G) \geq C_{i,min}, \forall i \in K\},$ --.

Column 9, line 6, in Claim 3, delete "$C_i$ min." and insert -- $C_{i,min}$ --.

Column 9, line 10, in Claim 4, delete " $u_i(P_i, P_{-i}, i \in K.$ " and insert -- $u_i(P_i, P_{-i}) = -\log_2 P_i, i \in K.$ --.

Column 9, line 16, in Claim 5, delete " $P_i^{t+1} = \min(p_i^*, P_{max}).$ " and insert -- $P_i^{t+1} = \min(P_i^*, P_{max}).$ --.

Column 9, line 24, in Claim 8, delete " $(K, \mathbf{P}, \{u_i(\cdot)\}),$ " and insert -- $(K, \mathbf{P}, \{u_i(\cdot)\}),$ --.

Column 9, lines 32-33, in Claim 9, delete " $u_i(P_i, P_{-i}; N, G, H) = \frac{C_i(P, H, N, G)}{P_i + P_c}, i \in K,$ " and insert -- $u_i(P_i, P_{-i}; N, G, H) = \frac{C_i(P, H, N, G)}{P_i + P_c}, i \in K.$ --.

Column 10, line 1, in Claim 9, delete "$C_i$ min." and insert -- $C_{i,}$ min. --.

Signed and Sealed this
Twenty-eighth Day of August, 2012

David J. Kappos
*Director of the United States Patent and Trademark Office*